(12) United States Patent
Griffin et al.

(10) Patent No.: US 7,649,691 B2
(45) Date of Patent: Jan. 19, 2010

(54) DYNAMIC VARIABLE SHAPE OPTICAL ELEMENT

(75) Inventors: Steven F. Griffin, Albuquerque, NM (US); Arturo A. Jacobs, Edgewood, NM (US); Karl N. Schrader, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/143,262

(22) Filed: Jun. 20, 2008

(65) Prior Publication Data

US 2009/0316251 A1 Dec. 24, 2009

(51) Int. Cl.
G02B 3/00 (2006.01)

(52) U.S. Cl. ........................................ 359/642

(58) Field of Classification Search ................ 359/642, 359/665–667, 838–884; 372/98–107
See application file for complete search history.

(56) References Cited

U.S. PATENT DOCUMENTS

| | | | |
|---|---|---|---|
| 3,731,103 | A | 5/1973 | O'Meara |
| 4,438,330 | A | 3/1984 | Hardy |
| 5,016,997 | A | 5/1991 | Bliss et al. |
| 5,026,977 | A | 6/1991 | Hubbard, Jr. |
| 6,398,372 | B1 | 6/2002 | Okada |
| 6,452,145 | B1 | 9/2002 | Graves et al. |
| 6,728,024 | B2 | 4/2004 | Ribak |
| 6,874,897 | B2 | 4/2005 | Graves et al. |
| 7,229,178 | B1 | 6/2007 | Headley et al. |
| 7,264,363 | B2 | 9/2007 | Griffith et al. |
| 7,374,302 | B2 | 5/2008 | Griffith et al. |
| 2005/0254111 | A1 | 11/2005 | Griffith et al. |
| 2006/0103955 | A1 | 5/2006 | Griffith et al. |
| 2006/0103956 | A1 | 5/2006 | Griffith et al. |
| 2009/0116118 | A1* | 5/2009 | Frazier et al. ............... 359/666 |

FOREIGN PATENT DOCUMENTS

| | | |
|---|---|---|
| DE | 4236355 | 5/1994 |
| EP | 0708349 | 4/1996 |
| WO | WO 2007/077431 A1 | 7/2007 |

OTHER PUBLICATIONS

Sinha et al. Pub High Resolution Wavefront Control: Methods, Devices and Applications III, SPIE, vol. 4493 (2002) (pp. 55-63).

(Continued)

*Primary Examiner*—Darryl J Collins
(74) *Attorney, Agent, or Firm*—Haynes and Boone, LLP

(57) ABSTRACT

Systems and methods according to one or more embodiments are disclosed to provide a dynamic variable shape optical element for wavefront correction. In an embodiment, a variable shape optical element assembly includes an optical element having a front surface and a back surface with specified curvature characteristics. The variable shape optical element assembly also includes back knife edges having a designated shape disposed on the back surface of the optical element and front knife edges having a designated shape disposed on the front surface of the optical element. The variable shape optical element assembly further includes a mechanical arrangement adapted to apply a dynamic mechanical force to create the specified curvature characteristics.

26 Claims, 10 Drawing Sheets

OTHER PUBLICATIONS

A. Kudryashov et al. "Adaptive Optics for High-Power Laser Beam Control", ISSN: 0930-8989, vol. 102 (2005) (pp. 237-248).

B.S. Vinevich,"Cooled and Uncoooled Single-Channel Deformable Mirrors for Industrial Laser Systems", Quantum Electronics 28, (1998) (pp. 366-369).

J. Schwarz et al. "Development of a Variable FocalLength Concave mirror for On-Shot Thermal lens Correction in Rod Amplifiers", Optics Express, vol. 14, No. 23 (2006) (pp. 13).

Commercial Product: "Variable Radius Mirror", Company II-VI, Inc., Web Link: http://www.iiviinfrared.com/products/mirrors.html#anchor_vrm (pp. 6).

Ken'ichi, "Adaptive Optics for High Power Lasers", Review of Laser Engineering, Vo. 27, No. 2 (1998)(pp. 84-88).

A. Yu et al.; "Compensation of Dynamic Thermal Deformation of Mirrors in High-Power Slab Lasers"; Quantum Electronics, 34(11) pp. 1040-1046; 2004.

T.C. Tseng; "Developement of an Aspherical Bimorph PZT Mirror Bender with Thin Film Resistor Electrode"; Advanced Photon Source, Argonne National Lab; pp. 271-278; 2002.

Ehud Steinhaus et al.; "Bimorph Piezoelectric Flexible Mirror"; J. Opt. Soc. Am., vol. 69; pp. 478-481; 1979.

G. Rabczuk et al.; "Control of a High-Power CW CO2 Laser output Beam Properties by Using . . . "; The Szewalski Institute of Fluid Flow Machinery; Poland; no date.

A.V. Ikramov et al.; "Cooled Bimorph Adaptive Mirors For Laser Optics"; Quantum Electronics, 24(7) pp. 613-617; 1994.

T. Yu et al.; "Doughnut-Like Laser Beam Output Formation By Intracavity Flexible Controlled Mirror"; Optics Express, vol. 3, pp. 188-189; 1998.

Andrey G. Safronov; "Bimorph Adaptive Optics: Elements, Technology and Design Principles"; 494/SPIE vol. 2774; 1996.

A. Abbas et al.; "Thermal Lens Correction in A Solid-State Laser Using a Flexible Bimorph Mirror"; Sov. J. Quantum Electron, 19(10); pp. 1338-1340; 1989.

S. A. Kokoroski; "Analysis of Adaptive Optical Elements Made From Piezoelectric Bimorphs"; J. Opt. Soc. AM., vol. 69; pp. 181-187; 1979.

P. Halevi; "Bimorph Piezoelectric Flexible Mirror: Graphical Solution and Comparison with Experiment"; Optical Society of America; pp. 110-113; 1983.

* cited by examiner 0.9 scaling of knife edges in horizontal 0.8 scaling of knife edges in horizontal

DYNAMIC VARIABLE SHAPE OPTICAL ELEMENT

TECHNICAL FIELD

The present disclosure relates generally to laser systems and more particularly to a variable shape optical element.

BACKGROUND

All high power solid-state lasers experience some distortion of the laser beam due to temperature and stress-induced changes in the refractive index of the lasing material. In the case of cylindrical geometry lasers, the non-uniform temperature distribution is radially parabolic, resulting in a thermal lensing of the beam. Although a fixed focal length spherical optic can correct this aberration at one operating point, the degree of thermal lensing generally varies in proportion to the level of optical pumping, or heat dissipated. Therefore, a variable powered optic is sometimes necessary to avoid mode instabilities that can result in poor mode/gain overlap and intra-resonator focusing of the beam, which can damage optics.

In long, thin solid-state gain elements, like rods, temperature dependent refractive index is the primary aberrating mechanism. However, in very thin gain elements, like disks, thermal bending of the lasing medium due to stress buildup is predominant although it is still largely a parabolic wavefront distortion in nature. This effect is compounded when multiple rods or disks are used serially in the resonator. A variable power optical element is therefore used for high power solid state lasers and amplifiers to correct thermal focus aberrations.

Outside of a laser cavity there often exists the need to dynamically change the shape of a laser beam wavefront. For example, aberrations in the wavefront due to temporally varying thermal effects inside or outside of the laser cavity can lead to decreased system performance unless the wavefront is dynamically corrected. In another application, it may be desirable to dynamically vary the radius of curvature of a laser beam wavefront in order to focus on a target whose range is varying with time.

A commonly employed method of adaptive optics consists of many individually controlled mirror segments. This method is characterized by a large optical surface area, necessitating the incorporation of large and expensive beam expanders and telescopes into the beam train. Other methods of adaptive optics, such as bimorph mirrors, may not operate with high wavefront quality at the high flux levels required for high power applications.

Many existing methods of dynamic wavefront control employ numerous addressable elements which may need to be addressed individually to achieve proper operation. Although a large number of individually addressable elements are necessary for control of wavefronts with rapid spatial variation, this presents a higher cost and unnecessary complication for applications in which the aberrations are low-order (spatial variation of the wavefront is slow). Other existing methods that perform only low-order wavefront correction suffer from low dynamic bandwidth or poor wavefront quality. Yet other approaches to wavefront correction of high power beams may employ active cooling or other heat removal methods, which can also add complexity and increase costs.

SUMMARY

Systems and methods according to one or more embodiments provide a dynamic variable shape optical element for focusing and higher order wavefront control in laser systems.

In one embodiment, a variable shape optical element assembly comprises: an optical element having a front surface and a back surface with specified curvature characteristics; back knife edges having a designated shape disposed on the back surface of the optical element; front knife edges having a designated shape disposed on the front surface of the optical element; and a mechanical arrangement adapted to apply a dynamic mechanical force to create the specified curvature characteristics.

In another embodiment, a method of performing focus correction comprises: applying a voltage to an actuator linkage based on a sensed focus error, wherein the actuator linkage comprises an actuator, an axial flexure, a cross-blade flexure, and compliant guides; applying a force substantially normal to an optical element while substantially no moment or transverse loads are applied to the optical element; and deforming the optical element by compressing opposing knife edges having differing dimensions to correct the sensed focus error.

In another embodiment, a variable shape optical element assembly comprises: an actuator linkage including: a mechanical preload bolt; an axial flexure; a cross blade flexure; and an actuator connected to the mechanical preload bolt at one end and to the axial flexure and the cross blade flexure at another end; front knife edges; back knife edges; and an optical element disposed between the front knife edges and the back knife edges, wherein the front knife edges and the back knife edges are adapted to be compressed to deform the optical element in response to a dynamic force applied by the actuator linkage, wherein the axial flexure is adapted to force the actuator to apply a force that is substantially normal to the optical element, and the cross blade flexure is adapted to compensate for misalignments due to mechanical tolerances and does not allow transverse moments or loads to be applied to the back knife edges of the optical element.

The scope of the disclosure is defined by the claims, which are incorporated into this section by reference. A more complete understanding of embodiments will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments and their advantages are best understood by referring to the detailed description that follows. It should be appreciated that like reference numerals are used to identify like elements illustrated in one or more of the figures.

DETAILED DESCRIPTION

Systems and methods are provided that are optimally suited for introducing low-order spatial variations in a laser beam wavefront and are inexpensive to manufacture, simple to implement, may be operated with a high dynamic bandwidth, and are capable of having very high wavefront quality.

Figure 1:
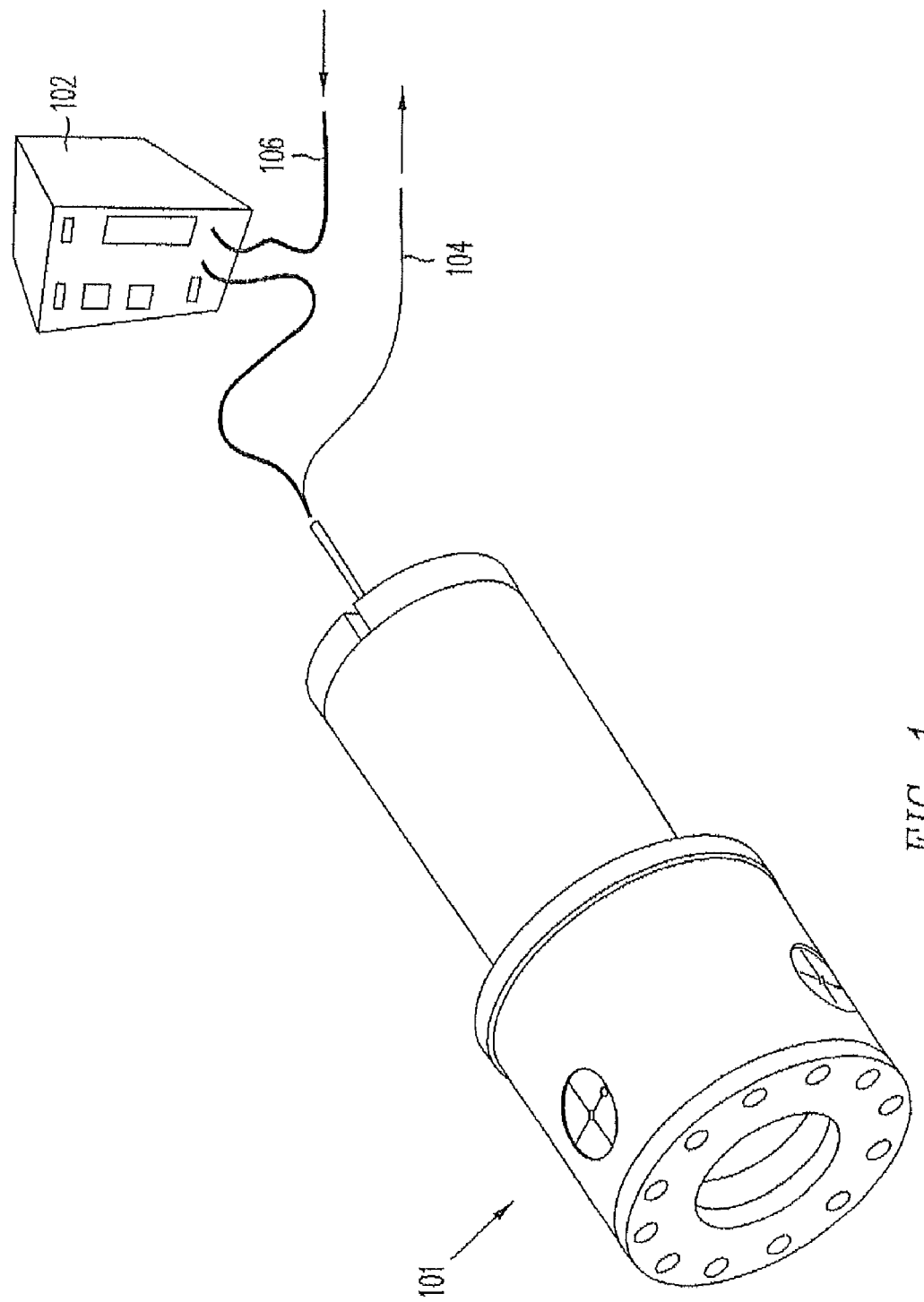
FIG. 1 shows a perspective view of a variable shape optical element (VSOE) system in accordance with an embodiment of the disclosure.

Referring to FIG. 1, a perspective view of a variable shape optical element (VSOE) system is shown in accordance with an embodiment of the disclosure. In this embodiment, a VSOE assembly 101 is electrically connected to an amplifier 102, for example a piezo amplifier. Amplifier 102 may be electrically connected to receive control signal 106 as an input, and VSOE assembly 101 may be electrically connected to output sensor signal 104. The electrical inputs and outputs may be similar to any piezoceramic device. Amplifier 102 is adapted to drive VSOE assembly 101. Amplifier 102 may be a high voltage, low current amplifier having stability when driving a reactive load, and may be a commercial off the shelf (COTS) amplifier designed to drive piezoceramics.

Figure 2:
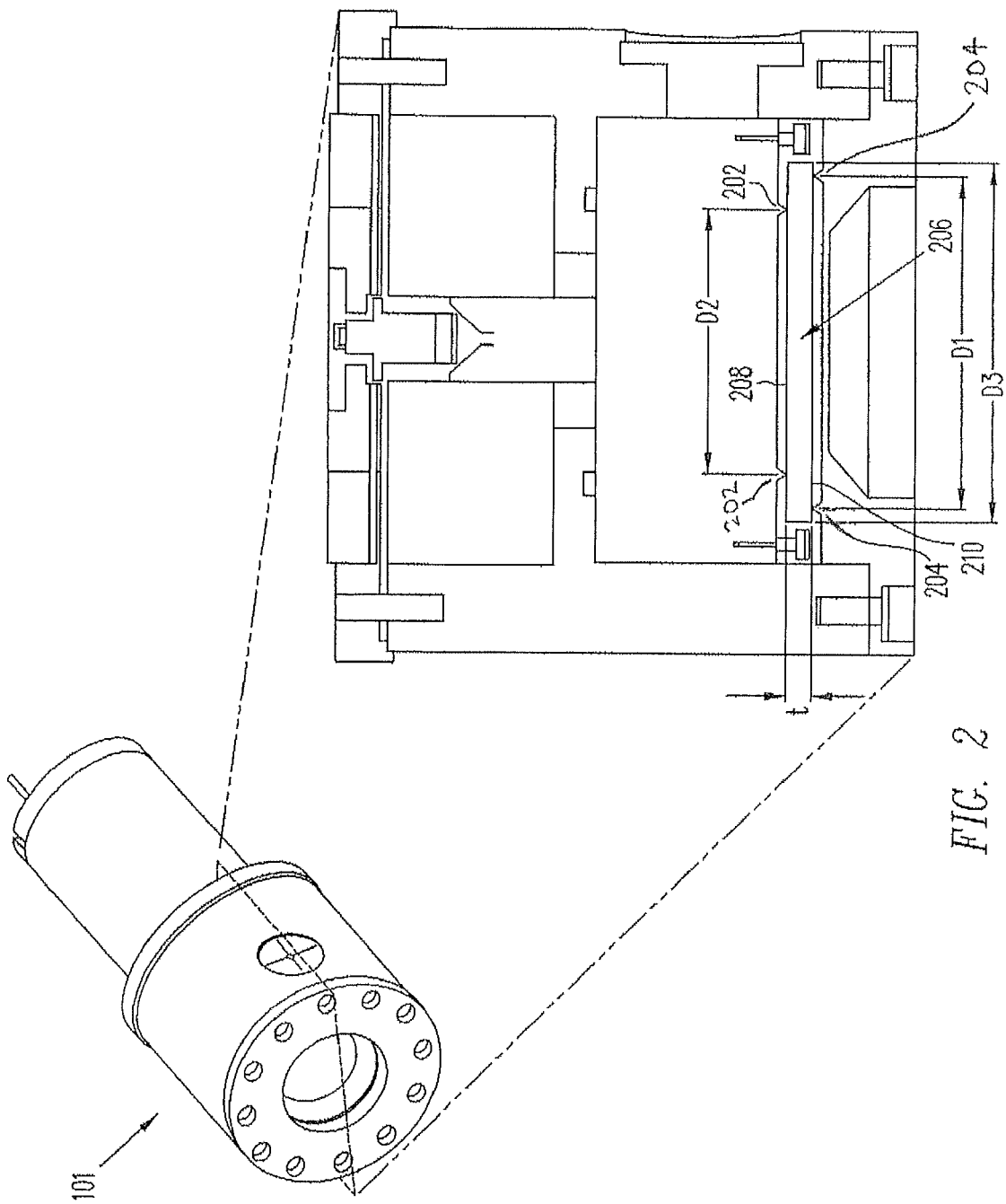
FIG. 2 shows a cutaway view of a portion of the variable shape optical element system of FIG. 1 for an intracavity application according to an embodiment of the disclosure.

FIG. 2 is a cutaway view of a portion of the VSOE assembly 101 of FIG. 1 in an intracavity application according to an embodiment of the disclosure. Variable shape optical element (VSOE) assembly 101 includes back knife edges 202, front knife edges 204, and an optical element 206, which may include a reflective optic. Front knife edges 204 are disposed on front surface 210 of optical element 206. Back knife edges 202 are disposed on back surface 208 of optical element 206.

Back knife edges 202 and front knife edges 204 may be precision lapped to avoid higher order aberrations when compression is applied by an actuator, for example a piezo actuator, which will be described with respect to FIG. 3 below.

The actuator may, for example, apply between approximately 0 and 1500 lbs. of compression to the knife edge/optical element combination, resulting in a convex deformation of optical element front surface 210. Alternatively, the large radius of front knife edges 204 and the small radius of back knife edges 202 may be reversed to allow for concave deformation. The use of a specified curvature characteristic of optical element 206, for example, a plano concave optical element, may allow bias adjustment of range from negative to positive, flat to positive, or negative to flat.

Front knife edges 204, in this embodiment, may have a diameter "D1" of approximately 1.9 inches, while back knife edges 202 may have a diameter "D2" of approximately 1.2 inches. These concentric knife edges may compress a circular optical element having a diameter "D3" of approximately 2 inches and a thickness "t" of approximately 0.125 inches, for example. In an intracavity application the usable aperture in this configuration is approximately 0.5 inches.

Back knife edges 202 and front knife edges 204 may be circular, coming to a precisely sharpened "point" where contact is made with optical element 206. However, back knife edges 202 and front knife edges 204 may also have other specified shapes including substantially oval shapes or other specified shapes determined to optimally reduce a sensed wavefront error.

Optical element 206 may have a coating that may reflect, for example, as much as 99% of transmitted energy. However, a small amount of energy leakage may still occur, which may be enough to cause undesirable system heating. In one or more embodiments, back knife edges 202 may thus be designed to absorb transmitted energy, thus eliminating undesirable component heating. For example, back knife edges 202 may be designed to absorb transmitted energy by having a built-in beam dump incorporated therein to avoid distortion of a wavefront in a high energy beam or to keep optical element 206 from being distorted. The built-in beam dump may avoid such distortion because energy would be absorbed into a metal that composes the beam dump and the back knife edges 202.

Figure 3:
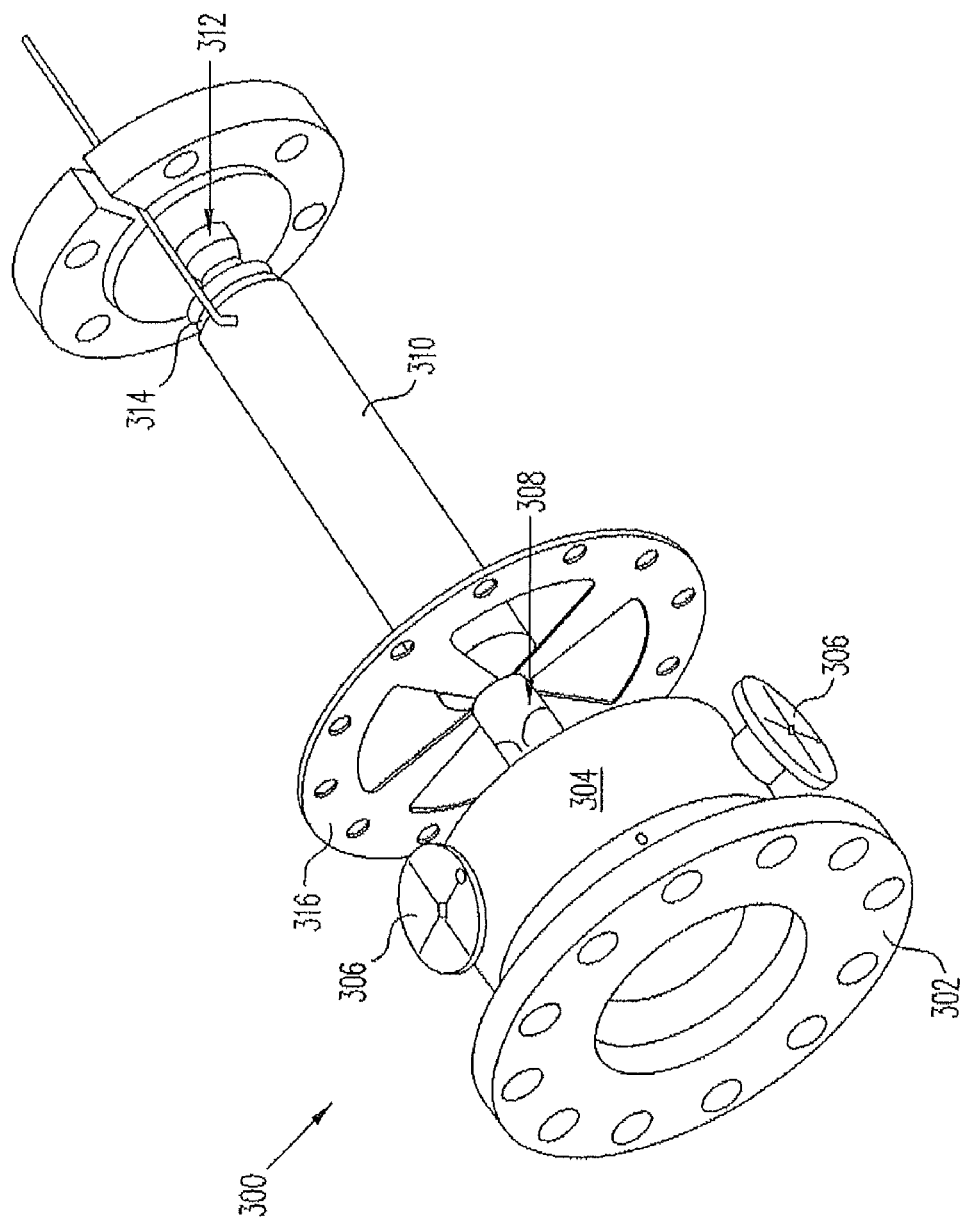
FIG. 3 shows a high force actuator linkage in accordance with an embodiment of the disclosure.

Referring now to FIG. 3, a high force actuator linkage is shown in accordance with an embodiment of the disclosure. The actuator linkage 300 may be a part of VSOE assembly 101 of FIG. 1 and FIG. 2. Actuator linkage 300 comprises an actuator 310 connected to a mechanical preload bolt 312 through a ball joint 314 at one end, and to an axial flexure 316 and a cross blade flexure 308 at the other end. Actuator linkage 300 also comprises compliant guides 306 disposed on an inner ring assembly 304, which faces an outer ring assembly 302. Therefore, outer ring assembly 302 is mechanically attached to mechanical preload bolt 312 such that the parts of VSOE assembly 101 are constrained together by a housing (as shown in FIG. 1). The arrangement of actuator linkage 300 allows optical element 206 to be compressed between back knife edges 202 and front knife edges 204 in a uniform way in dynamic applications. Uniformity is achieved by the optical element 206 only being subjected to axially symmetric forces normal to its surface and not subjected to transverse forces or moments, as applied by front knife edges 204 and back knife edges 202. This insures that compression by the knife edges induces the intended shape in optical element 206, without causing higher order aberrations. To accomplish this, axial flexure 316 forces actuator 310 to apply a force that is substantially normal to the optical element's surface. Cross blade flexure 308 compensates for any misalignment due to mechanical tolerances in the housing and does not allow any transverse moments to be applied to back knife edge 202. If there were no axial flexure 316, for example, optical element 206 may tilt and have undesired distortion.

Compliant guides 306 keep back knife edges 202 centered with actuator 310, axial flexure 316 and cross blade flexure 308. Mechanical preload bolt 312 along with ball joint 314 allow the application of a light mechanical preload in a direction normal to optical element 206 without applying any transverse forces or moments.

A shape bias may be prescribed to account for a light mechanical preload so that when 0 volts are applied by actuator 310, the deformation has a predetermined starting point. That is, optical element 206 may have specified curvature characteristics on its front surface and back surface so that a small preload causes the front surface to display a pre-specified radius of curvature ranging from concave to flat to convex. The preload removes any gaps in actuator linkage 300 and excellent wavefront quality is achieved throughout the range of applied voltage by actuator 310.

Figure 4:
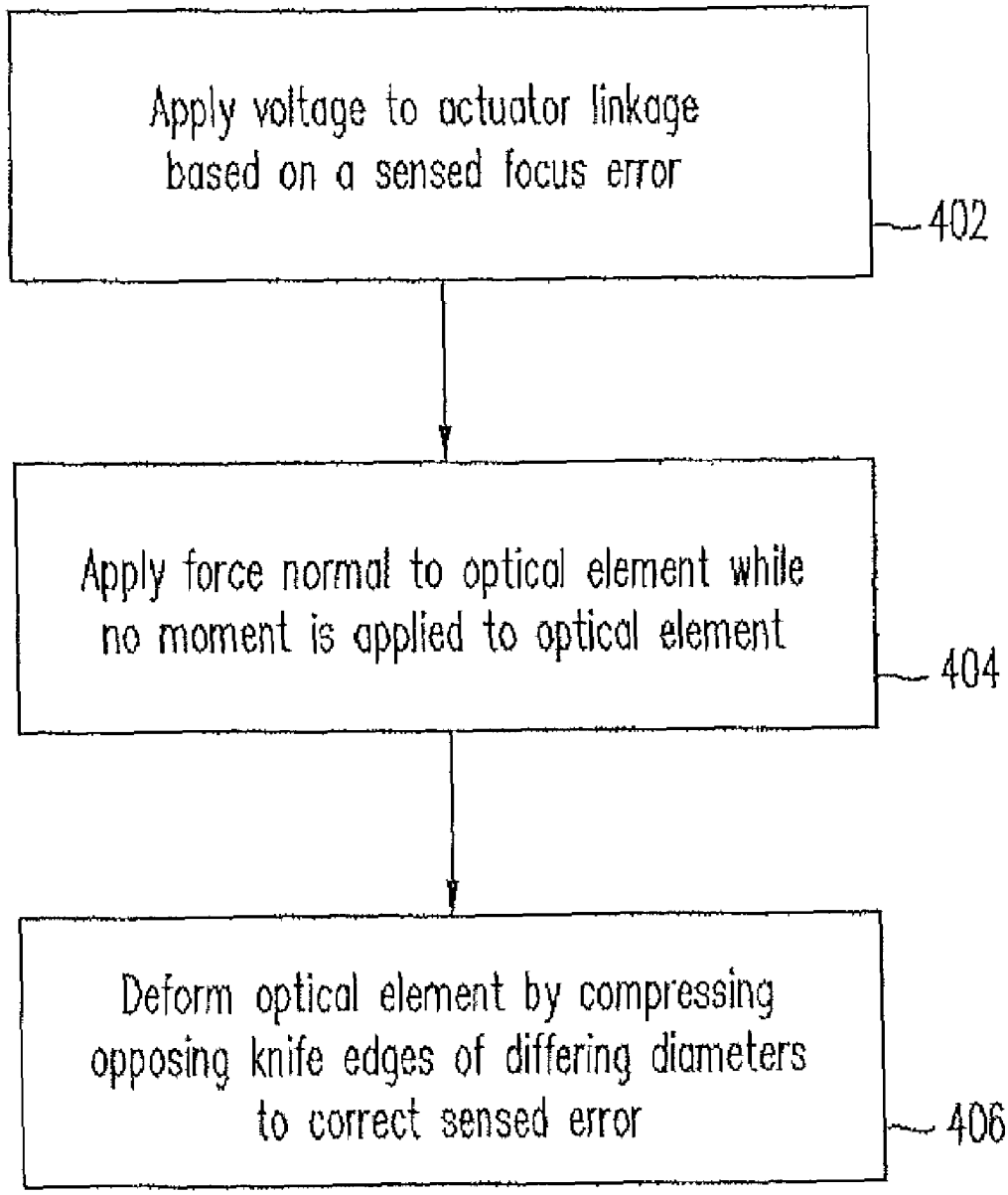
FIG. 4 shows a method of force application in the actuator linkage of FIG. 3 in accordance with an embodiment of the disclosure.

Referring now to FIG. 4, a method of force application by the actuator linkage of FIG. 3 is shown in accordance with an embodiment of the disclosure. This method of force application avoids higher order aberrations.

In block 402, a controlled voltage is applied to actuator linkage 300 of FIG. 3. The voltage may be applied via control signal 106 (shown in FIG. 1) based on how much wavefront correction is needed. Sensor signal 104 reflects how much actuator 310 moves when control signal 106 is applied. A servo control may either be accomplished using a local strain gage sensor with a COTS high bandwidth strain gage bridge, displacement sensor behind a back knife edge, or a focus sensor at a strategic location in the laser beam path.

In block 404, a force normal to optical element 206 is applied while no moment or transverse load is applied to optical element 206.

In block 406, optical element 206 is deformed by compressing opposing knife edges of differing diameters as described above with respect to FIG. 2 to perform sensed error correction.

This method of force application by a mechanical arrangement including the actuator linkage according to an embodiment is beneficial because axial flexure 316 and cross blade flexure 308 impart an axial force component without bending. This allows optical element 206 to exhibit low higher-order aberration when deforming in, for example, a spherical shape. High bandwidth control is also made possible because the load path, including actuator 310, optical element 206, axial flexure 316, cross blade flexure 308, front knife edges 204 and back knife edges 202 results in a device having a very high resonance frequency with little or no deformation besides spherical. Therefore, this device may be used to correct deformations from a frequency range starting at direct current (DC) up to a very high frequency on the order of approximately 1000 Hz, for example. That is, VSOE assembly 101 and amplifier 102 (shown in FIG. 1) may have a dynamic actuation response for controlling a rapidly varying wavefront.

One or more embodiments provide a variable shape optical element (VSOE) device that may be used in intracavity applications (inside a laser cavity). These embodiments provide a device that performs wavefront correction required to counteract thermal distortion of optical elements inside the laser cavity, or to counteract thermal lensing of the gain media. This application is particularly beneficial in high power lasers that employ multiple gain media, wherein thermal lensing of the gain media is especially acute.

One or more embodiments provide a VSOE that may be used in extracavity applications (outside of a laser cavity). In extracavity applications, for example, in a beam director application, one or more embodiments provide a device that performs static and dynamic wavefront shape control. The device may also be used to control system focus for laser systems with rapidly moving targets, thus eliminating the need for focus correction to be accomplished by the beam director itself.

Figure 7:
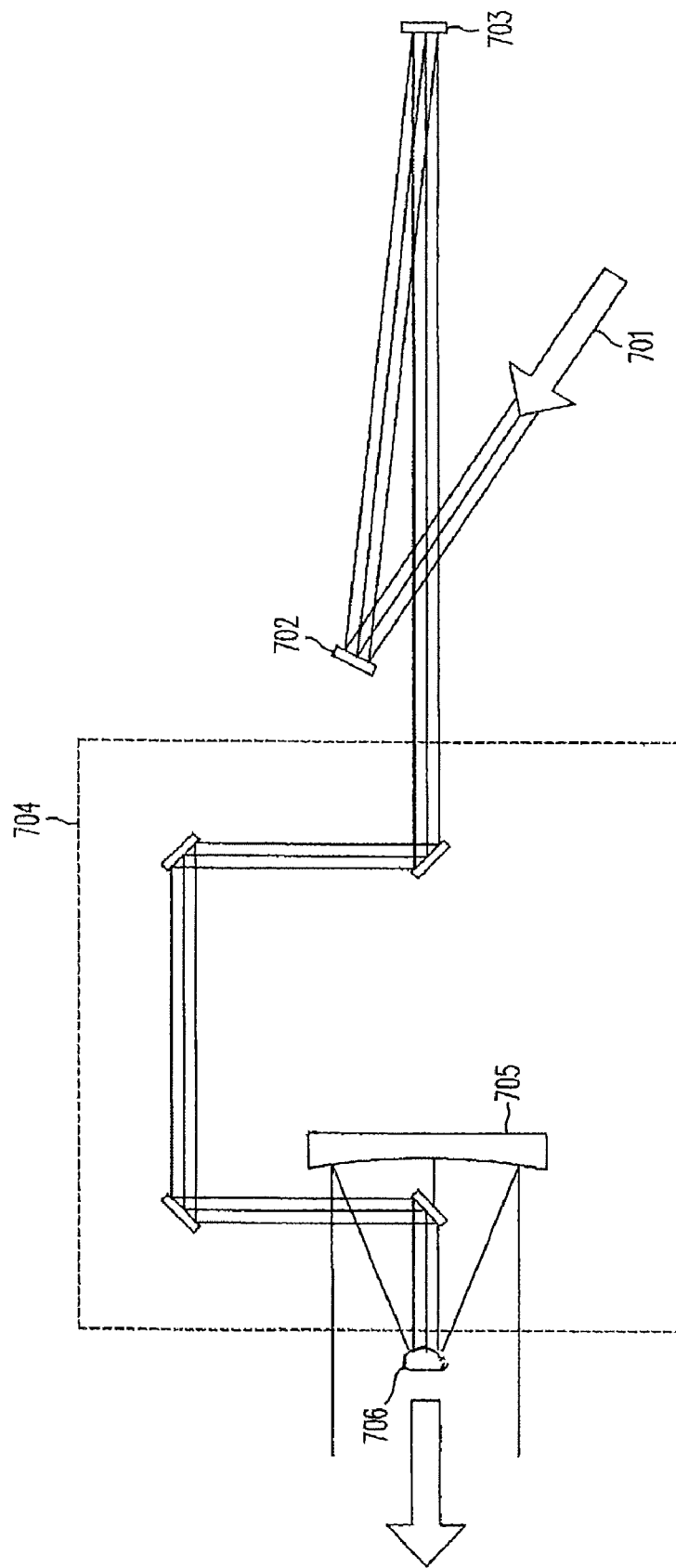
FIG. 7 shows an application at a near-normal angle of incidence in accordance with an embodiment of the disclosure.

One or more embodiments provide a variable shape optical element (VSOE) device that may be used at normal or near-normal incidence. Referring to FIG. 7, an application at a normal or near-normal angle of incidence is shown in accordance with an embodiment of the disclosure. With reference to FIG. 7, a laser beam 701 is incident upon a flat mirror 702 and then upon a VSOE 703 at a small angle with respect to the surface normal. In accordance with previous discussion, the surface of VSOE 703 may be either concave (to induce focusing of the beam), or convex (to induce divergence of the beam). The laser beam reflected from VSOE 703 then enters a beam director assembly 704. In this application, focus control of the beam exiting beam director assembly 704 may be accomplished with the VSOE 703 rather than by changing the separation between a primary mirror 705 and a secondary mirror 706.

In a beam director VSOE application (with reference to FIG. 2), front knife edges 204, according to an embodiment, may have a diameter "D1" of approximately 7.75 inches, while back knife edges 202 may have a diameter "D2" of approximately 4.8 inches. These concentric knife edges may compress an optical element having a thickness "t" of 0.75 inches and a diameter "D3" of approximately 8 inches, for example. The usable aperture in this beam director configuration would be 2.5 inches.

Figure 8:
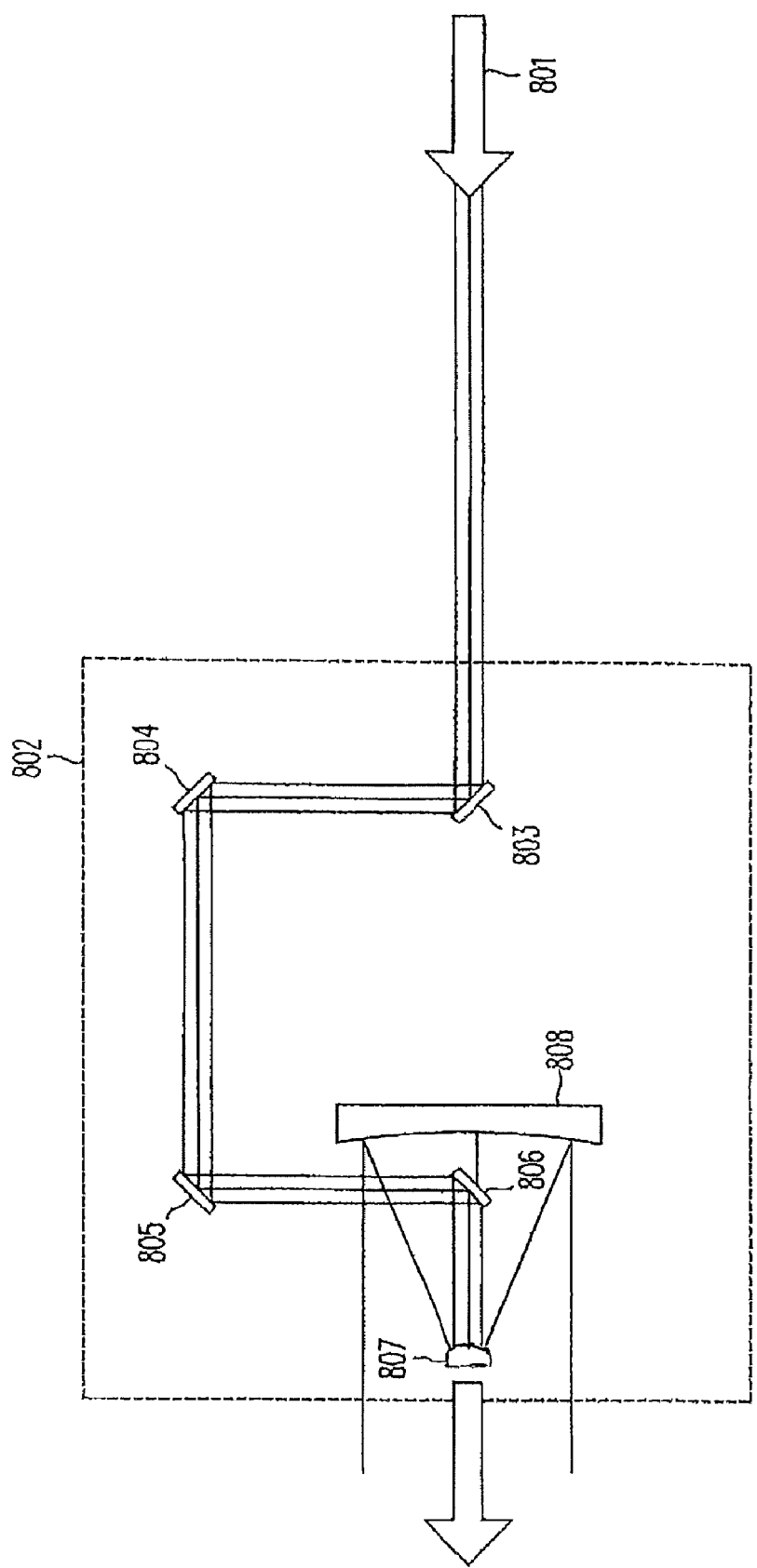
FIG. 8 shows an application at a substantially non-normal angle of incidence in accordance with an embodiment of the disclosure.

One or more embodiments provide a variable shape optical element (VSOE) device that may be used at substantially non-normal incidence. Referring to FIG. 8 an application at a substantially non-normal angle of incidence is shown in accordance with an embodiment of the disclosure. In FIG. 8, a laser beam 801 enters beam director assembly 802, first striking flat mirrors 803, 804, and 805, before striking a variable shape optical element (VSOE) 806 at an angle with respect to the surface normal of approximately 45 degrees. The beam reflected from VSOE 806 then strikes a secondary mirror 807 and a primary mirror 808 before exiting beam director assembly 802. In accordance with previous discussion, the surface of VSOE 806 may be either concave (to induce focusing of the beam), or convex (to induce divergence of the beam). In this application where a VSOE is used for a substantially non-normal angle of incidence application, as in the application described in the previous paragraph where a variable shape optical element may be used for normal or near-normal incidence, focus control is accomplished with VSOE 806 rather than by changing the separation between primary mirror 808 and secondary mirror 807.

Figure 9:
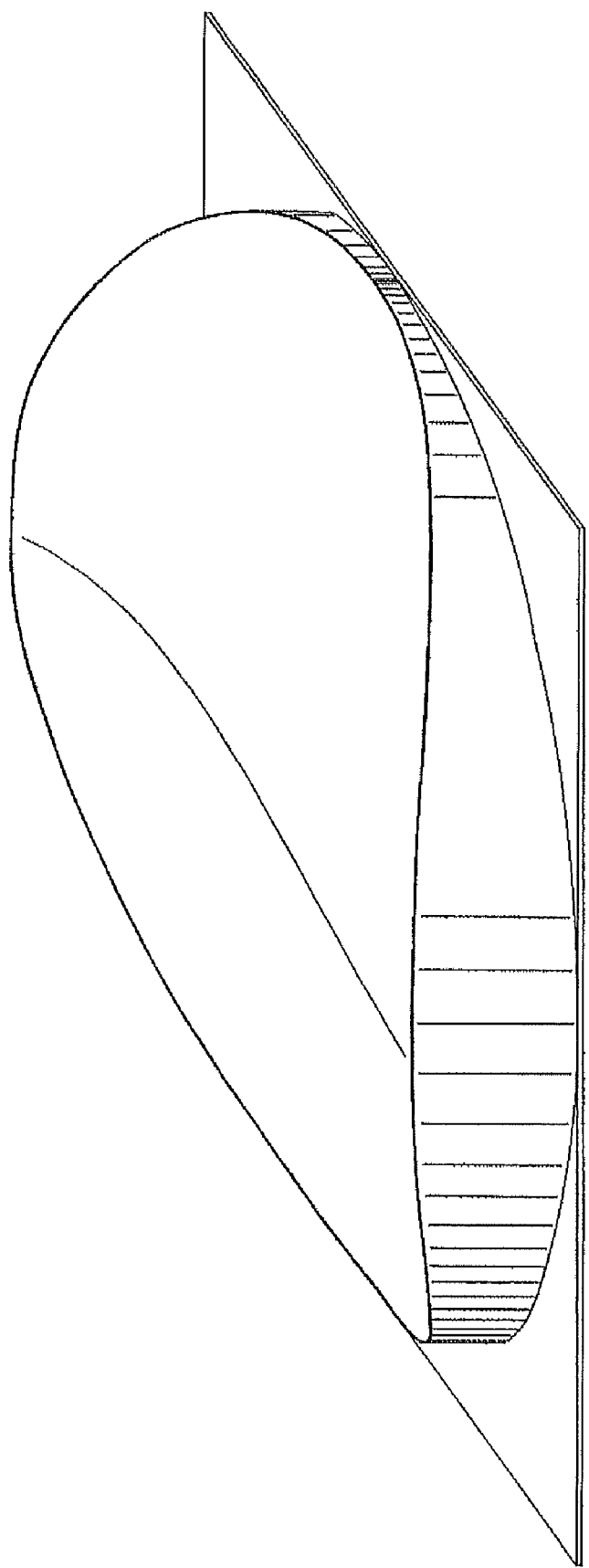
FIG. 9 shows an astigmatic wavefront phase induced on a beam incident on a spherical surface at a substantially non-normal angle of incidence.

In certain applications according to one or more embodiments, optimum performance may necessitate inducing a substantially non-rotationally symmetric shape to the surface of a variable shape optical element (VSOE). For example, when using the VSOE at a substantially non-normal angle of incidence, a spherical surface shape on the VSOE would result in a strongly astigmatic reflected wavefront phase, as shown in FIG. 9. FIG. 9 shows the astigmatic wavefront phase induced on a beam incident on a spherical surface at a substantially non-normal angle of incidence. This would result in dramatically reduced system performance.

Figure 5:
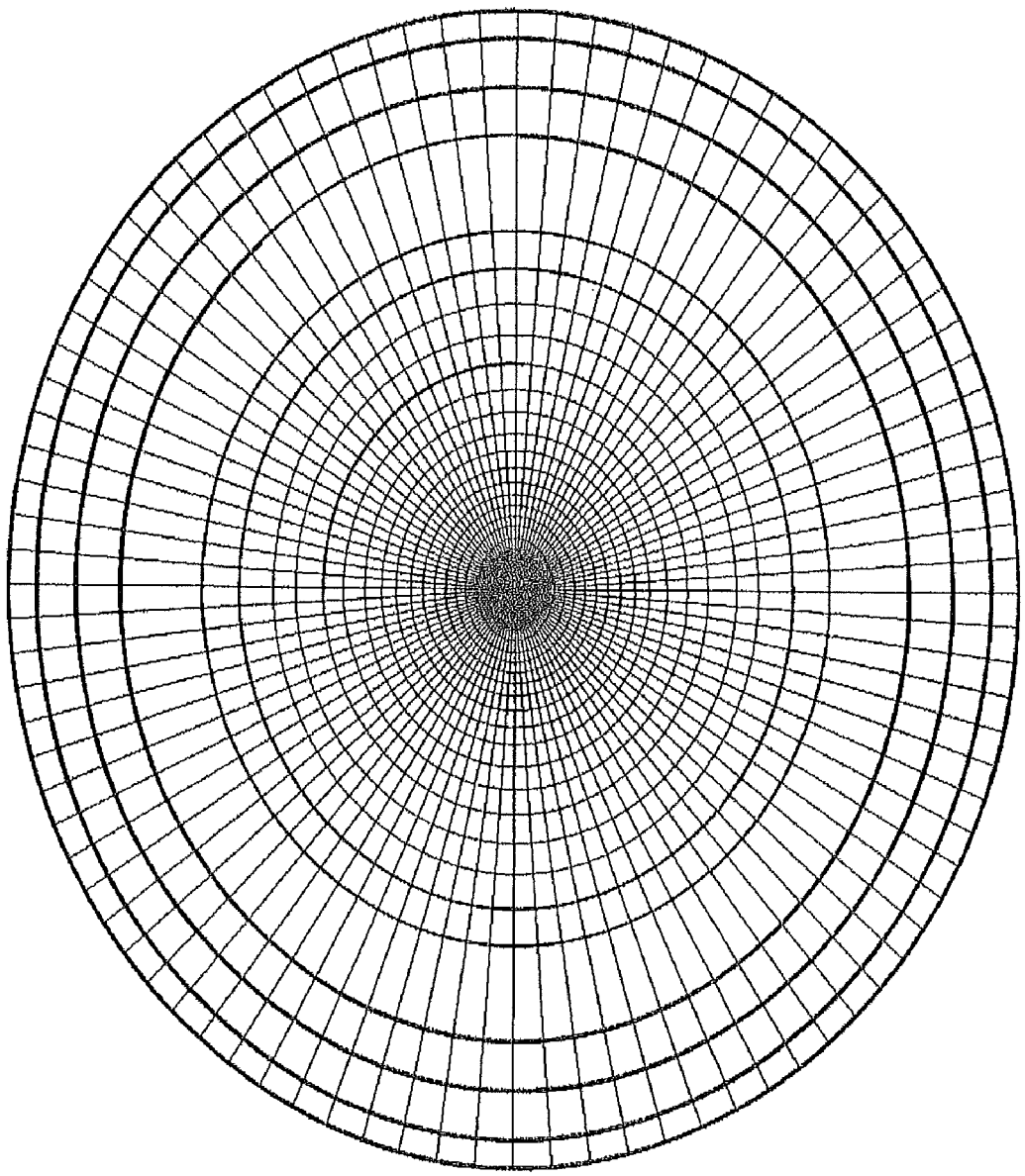
FIG. 5 and FIG. 6 show knife edges for a variable shape optical element focus in a beam director application according to different embodiments of the disclosure.
Figure 6:
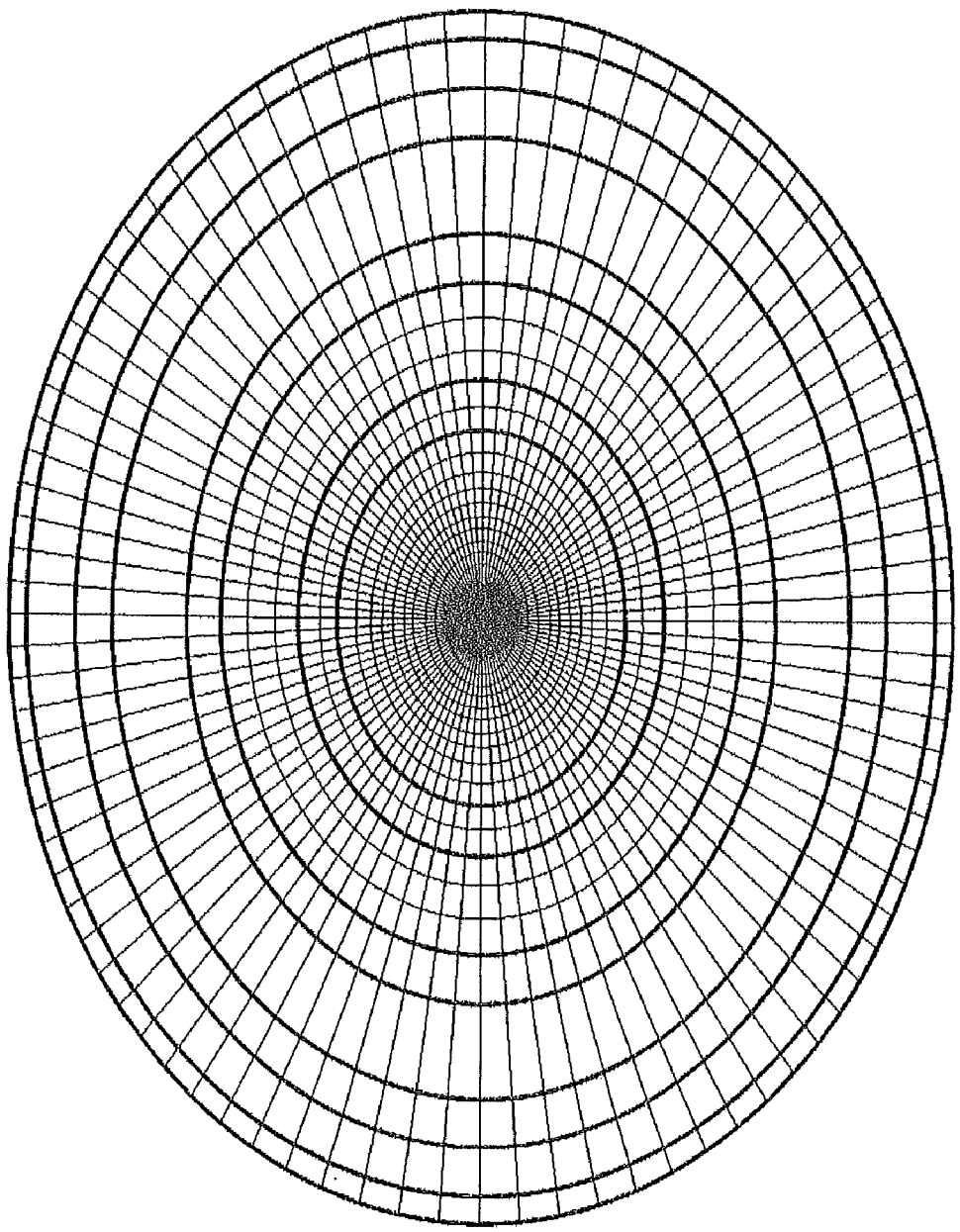

According to one or more embodiments, a substantially non-rotationally symmetric shape may be induced on the VSOE by employing oval knife edges, as shown in FIG. 5 and FIG. 6. FIG. 5 and FIG. 6 show knife edges for a variable shape optical element focus in a beam director application according to different embodiments of the disclosure. The image of FIG. 5 illustrates slightly oval knife edges for a horizontal to vertical axis ratio of 0.9 scaling. FIG. 6 illustrates slightly oval knife edges for a horizontal to vertical axis ratio of 0.8 scaling.

Figure 10:
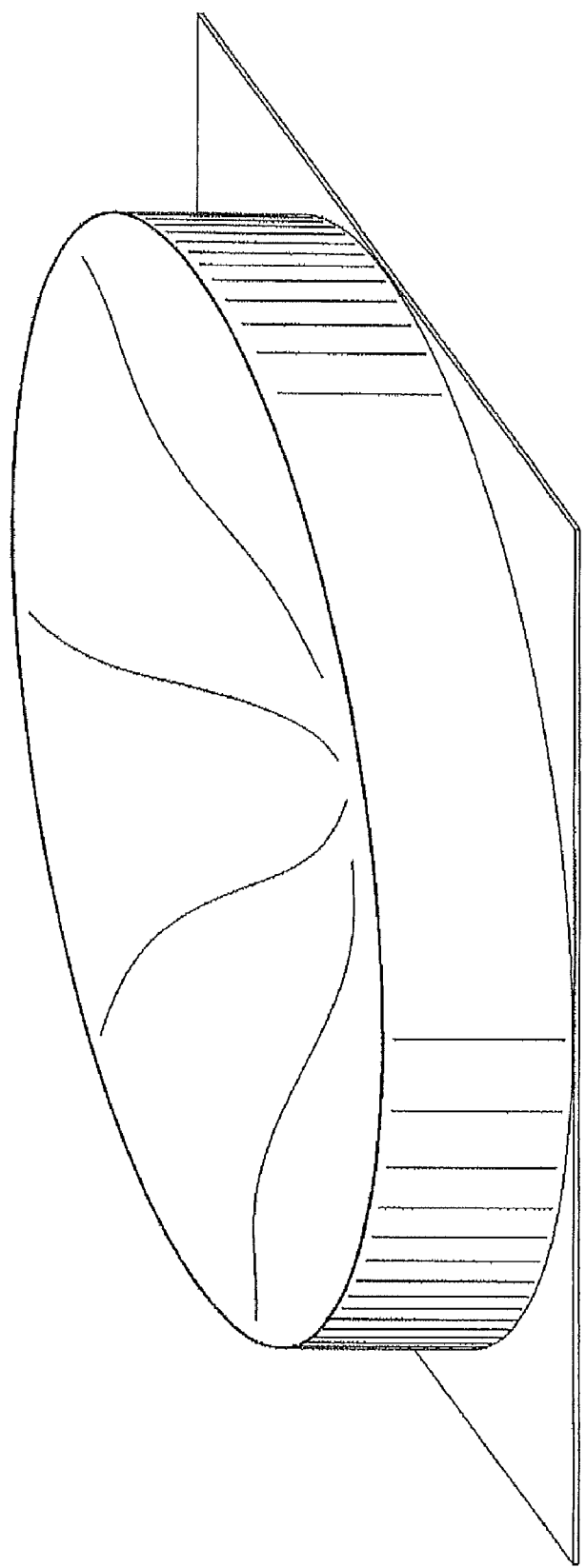
FIG. 10 shows a corrected wavefront phase (astigmatism removed) induced on a beam incident on a biconic surface at a substantially non-normal angle of incidence in accordance with an embodiment of the disclosure.

The oval knife edges impart a biconic shape to the surface of the VSOE so that, when employed at a substantially non-normal angle of incidence, the reflected wavefront will be free of astigmatism, as shown in FIG. 10. FIG. 10 shows the corrected wavefront phase (astigmatism removed) induced on a beam incident on a biconic surface at a substantially non-normal angle of incidence.

The following Table 1 summarizes, according to an embodiment, the dimensions for a beam director VSOE and the intracavity VSOE described in accordance with the embodiment of FIG. 2:

TABLE 1

|  | Glass Diameter (inches) | Glass Thickness (inches) | Front Knife Edge (inches) | Back Knife Edge (inches) | Usable Aperture (inches) |
| --- | --- | --- | --- | --- | --- |
| Intracavity | 2 | 0.125 | 1.9 | 1.2 | 0.5 |
| Beam director | 8 | 0.75 | 7.75 | 4.8 | 2.5 |

It will be appreciated that the dimensions set forth in Table 1 according to one or more embodiments are illustrative and not limiting. Various appropriate modified dimensions are possible and may be used according to one or more embodiments.

Embodiments described above illustrate but do not limit the disclosure. It should also be understood that numerous modifications and variations are possible in accordance with the principles of the present disclosure. Accordingly, the scope of the disclosure is defined only by the following claims.

We claim:

1. A variable shape optical element assembly comprising:
an optical element having a front surface and a back surface with specified curvature characteristics, wherein the front surface of the optical element is coated in order to reflect light;
back knife edges having a designated shape disposed on the back surface of the optical element, wherein the back knife edges absorb transmitted energy;
front knife edges having a designated shape disposed on the front surface of the optical element; and
a mechanical arrangement adapted to apply a dynamic mechanical force to create the specified curvature characteristics.

2. The assembly of claim 1, wherein the mechanical arrangement further comprises an actuator linkage comprising an actuator, an axial flexure, a cross-blade flexure, and compliant guides adapted to apply the dynamic mechanical force and compress the back knife edges and the front knife edges to deform the optical element.

3. The assembly of claim 1, wherein the variable shape optical element assembly is electrically connected to an amplifier, wherein the amplifier has a dynamic actuation response for controlling a rapidly varying wavefront.

4. The assembly of claim 1, wherein the specified curvature characteristics of the optical element further comprise a specified curvature on the front surface and the back surface so that a small preload causes the front surface to display a pre-specified radius of curvature ranging from concave to flat to convex.

5. A variable shape optical element assembly comprising:
an optical element having a front surface and a back surface with specified curvature characteristics, wherein the front surface of the optical element is coated in order to reflect light;
back knife edges having a designated shape disposed on the back surface of the optical element;
front knife edges having a designated shape disposed on the front surface of the optical element; and
a mechanical arrangement adapted to apply a dynamic mechanical force to create the specified curvature characteristics, wherein the variable shape optical element assembly is adapted for use in an intracavity application.

6. The assembly of claim 5, wherein the front knife edges and the back knife edges comprise a substantially circular shape.

7. The assembly of claim 6, wherein a shape induced on the back surface and the front surface of the optical element is rotationally symmetric.

8. A variable shape optical element assembly comprising:
an optical element having a front surface and a back surface with specified curvature characteristics, wherein the front surface of the optical element is coated in order to reflect light;
back knife edges having a designated shape disposed on the back surface of the optical element;
front knife edges having a designated shape disposed on the front surface of the optical element; and
a mechanical arrangement adapted to apply a dynamic mechanical force to create the specified curvature characteristics, wherein the variable shape optical element assembly is adapted for use in an extracavity application.

9. The assembly of claim 8, wherein the back knife edges and the front knife edges comprise a substantially circular shape or a substantially oval shape.

10. The assembly of claim 8, wherein the variable shape optical element assembly is adapted for use in a beam director application for focusing a beam.

11. The assembly of claim 8, wherein the variable shape optical element assembly is adapted for use at a near-normal angle of incidence.

12. The assembly of claim 8, wherein the variable shape optical element assembly is adapted for use at a substantially non-normal angle of incidence.

13. The assembly of claim 12, wherein a non-rotationally symmetric surface shape is induced on the optical element to correct for astigmatism.

14. The assembly of claim 13, wherein a biconic surface shape is induced on the optical element using oval knife edges.

15. A method of performing focus correction, the method comprising:
applying a voltage to an actuator linkage based on a sensed focus error;
applying a force substantially normal to an optical element while substantially no moment or transverse loads are applied to the optical element; and
deforming the optical element by compressing opposing knife edges having differing dimensions to correct the sensed focus error.

16. The method of claim 15, further comprising performing control of focus or control of a rotationally symmetric wavefront inside of a laser cavity.

17. The method of claim 15, further comprising performing wavefront control outside of a laser cavity.

18. The method of claim 15, further comprising performing wavefront control at a normal or near-normal angle of incidence.

19. The method of claim 15, further comprising performing wavefront control at a substantially non-normal angle of incidence.

20. The method of claim 15, further comprising performing wavefront control in a beam director application.

21. The method of claim 19, further comprising introducing a biconic shape to a surface of the optical element to correct for induced astigmatism.

22. The method of claim 21, wherein the introducing the biconic shape further comprises providing opposing knife edges with substantially oval shapes.

23. A variable shape optical element assembly comprising:
an actuator linkage comprising:
a mechanical preload bolt;
an axial flexure;
a cross blade flexure; and
an actuator connected to the mechanical preload bolt at one end and to the axial flexure and the cross blade flexure at another end;
front knife edges;
back knife edges; and
an optical element disposed between the front knife edges and the back knife edges, wherein the front knife edges and the back knife edges are adapted to be compressed to deform the optical element in response to a dynamic force applied by the actuator linkage, wherein the axial flexure is adapted to force the actuator to apply a force that is substantially normal to the optical element, and the cross blade flexure is adapted to compensate for misalignments due to mechanical tolerances and does not allow transverse moments or loads to be applied to the back knife edges of the optical element.

24. The assembly of claim 23, wherein the variable shape optical element assembly is adapted for use in an intracavity application or in an application outside or a laser cavity.

25. The assembly of claim 23, wherein the variable shape optical element assembly is electrically connected to an amplifier adapted to apply a controlled voltage to the variable shape optical element assembly to perform wavefront correction.

26. The assembly of claim 23, wherein the actuator linkage further comprises:
an inner ring assembly facing an outer ring assembly wherein the outer ring assembly is mechanically connected to the mechanical preload bolt;
compliant guides disposed on the inner ring assembly; and
a housing, wherein the actuator linkage is constrained together by the housing.

* * * * *